P. COUREMBIS.
EXPANDING WRENCH OR TOOL.
APPLICATION FILED APR. 5, 1913.
1,164,704.                                          Patented Dec. 21, 1915.
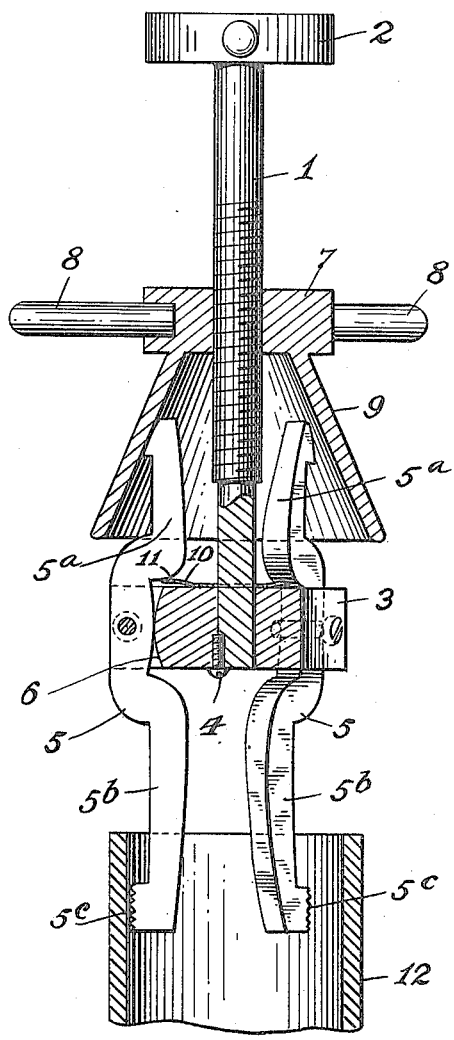
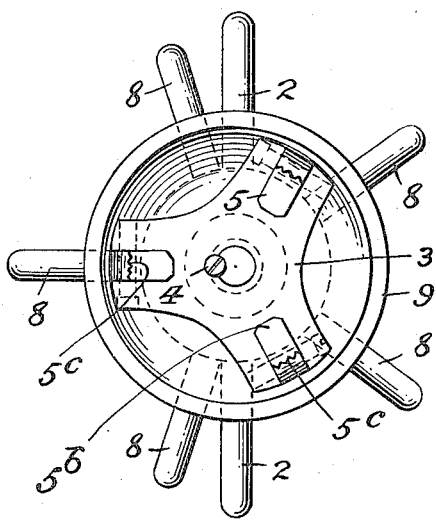

UNITED STATES PATENT OFFICE.

PETER COUREMBIS, OF NEW YORK, N. Y.

EXPANDING WRENCH OR TOOL.

1,164,704.

Specification of Letters Patent.

Patented Dec. 21, 1915.

Application filed April 5, 1913. Serial No. 759,049.

*To all whom it may concern:*

Be it known that I, PETER COUREMBIS, a citizen of the United States, residing at New York, in the county of New York and State of New York, have invented certain new and useful Improvements in Expanding Wrenches or Tools, of which the following is a specification.

My present invention is a tool adapted to grip the interior of pipes and fittings and the like and will be found especially useful to plumbers, etc.

The drawings show one of the specific embodiments which my improved tool may take, and in them—

Figure 1 is a side elevation partly in section illustrating the tool in use to grip the interior of the pipe, and Fig. 2 is an end view looking at the tool from below in Fig. 1.

I will now describe the specific devices of the drawings, reserving it to the claim to point out the novel features and to define the scope of the invention, it being understood that the claim will be given the due range of equivalents to which it may be entitled in view of the art.

1 is a threaded stem having a handle 2 at one end.

3 is a piece shown triangular held rigidly on the free end of the stem by means of a screw 4. The corners of this piece are slotted to receive into them the middle portions of the arms 5. Pivot screws pass through the sides of each slot and its contained arm to pivot the latter therein. These arms 5 extend in the general direction of the stem, their end portions 5ª and 5ᵇ being out of line with their middle portion by being located nearer the stem. The bottoms 6 of the aforesaid slots round upwardly and the adjacent surfaces of the middle portions of the arms 5 round oppositely that these may bear on each other at times during the rocking or tilting of the arms.

7 is a member on the stem 1 with screw-threaded connection therewith having handle means 8, and further having a hollow cone 9 extending toward and over the ends 5ª of the arms that project toward the handle end of the stem.

10 is a leaf-spring means acting between the piece 3 and the shoulders 11 (Fig. 1) of the arms 5ª to keep them normally expanded toward the wall of the cone 9.

Fig. 1 shows the tool in use with the arms 5ª which are the gripping arms roughened on their ends 5ᶜ for this purpose, expanded against and gripping the interior of a pipe 12 or other hollow fitting. This is effected by taking the handles 2 and 8, one in each hand, and then giving them a relative twisting movement so that the cone 9 is screwed toward and against the ends 5ª of the members 5, which thereby forces said ends together and simultaneously expands their opposite extremities 5ᶜ with any desired degree of force against the interior of the fitting. By the vice versa operation of the tool, the fitting is released.

The fact that the arms 5 are pivoted and arranged as shown permits the relative lengths of their end portions 5ª and 5ᵇ to be made anything desired with corresponding variations in leverage. Also, the fact that the ends 5ᵇ project freely beyond what may be called the body and operating parts of the tool, permits them to be entered without obstruction well into the fitting wherever situated. These and other advantages of the tool will be apparent to those skilled in the art.

What I claim is:

A tool comprising the combination of a threaded stem, a cross-piece at one end of said stem having generally radial slots whose bottoms are outwardly rounded in the direction of the axis of the stem, arms extending longitudinally of the stem pivoted at their middle portions in said slots in the cross-piece, said arms having their end portions out of line with their middle portions by being nearer the axis of the stem, the surface of said middle portions of the arms adjacent the bottoms of the slots being oppositely rounded to said bottoms, spring means operating between said middle portions of the arms and said cross-piece, and a member on the stem in screw-threaded engagement therewith having a hollow cone receiving into it one set of the ends of said arms.

In testimony whereof I affix my signature in presence of two witnesses.

PETER COUREMBIS.

Witnesses:
EDNA A. MORELAND,
E. W. SCHEER, Jr.

Copies of this patent may be obtained for five cents each, by addressing the "Commissioner of Patents, Washington, D. C."